US008215741B2

(12) United States Patent
Asai (10) Patent No.: US 8,215,741 B2
(45) Date of Patent: Jul. 10, 2012

(54) INKJET PRINTER AND PRINTING METHOD

(75) Inventor: Hiroshi Asai, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 294 days.

(21) Appl. No.: 12/727,028

(22) Filed: Mar. 18, 2010

(65) Prior Publication Data
US 2010/0245444 A1    Sep. 30, 2010

(30) Foreign Application Priority Data
Mar. 24, 2009   (JP) ................ P2009-72470

(51) Int. Cl.
*B41J 2/205*   (2006.01)
*G06K 15/00*   (2006.01)
(52) U.S. Cl. ............... 347/15; 358/3.06; 358/3.13
(58) Field of Classification Search .......... None
See application file for complete search history.

(56) References Cited

U.S. PATENT DOCUMENTS

| | | | |
|---|---|---|---|
| 4,727,430 A | 2/1988 | Miwa | |
| 5,541,743 A | 7/1996 | Shiomi et al. | |
| 5,721,625 A | 2/1998 | Furusawa et al. | |
| 6,532,082 B1 | 3/2003 | Dewitte | |
| 2004/0061879 A1 | 4/2004 | Takano et al. | |
| 2008/0192298 A1 | 8/2008 | Asai | |

FOREIGN PATENT DOCUMENTS

| | | |
|---|---|---|
| JP | 61-285867 | 12/1986 |
| JP | 7-264402 | 10/1995 |
| JP | 7-333822 | 12/1995 |
| JP | 10-070658 | 3/1998 |
| JP | 2001-257879 | 9/2001 |
| JP | 2004-129267 | 4/2004 |
| JP | 2006-123559 | 5/2006 |
| JP | 2008-199154 | 8/2008 |

*Primary Examiner* — Stephen Meier
*Assistant Examiner* — Tracey McMillion
(74) *Attorney, Agent, or Firm* — McDermott Will & Emery LLP (57) ABSTRACT

The low and high occupancy rate matrix sets are stored in the inkjet printer which performs printing with dots having different sizes. For the original image where banding unevenness easily appears, used is the low occupancy rate matrix set where the occupancy rate of all dots is lower than 100% in the maximum value of gray level and the proportion of the large dots is high in a high range of gray level. For the original image where reproducibility of details is required, used is the high occupancy rate matrix set where the occupancy rate of all dots becomes 100% in a value of gray level lower than the maximum value of gray level and the proportion of the small dots is high in a middle range of gray level. It is therefore possible to perform appropriate printing in accordance with the classification of the original image.

18 Claims, 7 Drawing Sheets

INKJET PRINTER AND PRINTING METHOD

TECHNICAL FIELD

The present invention relates to a technique of performing inkjet printing.

BACKGROUND ART

In an inkjet printer, a gray scale original image which is a continuous-tone image is halftoned (i.e., converted to a halftone image), and an image is represented by presence or absence of droplets of ink ejected onto a printing medium. An error diffusion method where quantization errors are distributed to peripheral pixels, a method where the original image is compared with a threshold matrix having threshold values with respect to every pixel to generate a halftone image and so on are known as halftoning methods.

Recently, since droplets ejected in the inkjet printer are miniaturized, representation of image with high resolution is achieved and sharp letters and lines can be printed. And also graininess of image is improved by miniaturization of droplet size so that a soft gradation can be obtained. On the other hand, since the weight of droplet of ink becomes lighter, flight of the droplet is unstable. Especially in single-pass printing, banding unevenness (mura) easily appears in a natural image and a tint image.

Japanese Patent Application Laid-Open No. 2006-123559 (Document 1) discloses an inkjet printer where input image data is multi-valued by the error diffusion method. In the inkjet printer, dot diameter of ink is switched between printing of image where good graininess (i.e., low graininess) is required even if resolution goes down and printing of image where high resolution is required. In the case where the error diffusion method is used, when small ink droplets are disposed in large numbers, graininess of image becomes better but substantial resolution goes down. In the inkjet printer, ink droplets having small ink dot diameter are used when required is an image having good graininess such as a portrait, and ink droplets having large ink dot diameter are used when required is an image having substantially high resolution such as a design drawing even if it has bad graininess (i.e., high graininess).

In a method of generating a printing plate image disclosed in Japanese Patent Application Laid-Open No. 07-264402 (Document 2), by applying a Laplacian filter to density data of an article image, filtered data showing local spatial frequencies is obtained. And by comparing the filtered data with a threshold value, either high resolution dots or low resolution dots are selected as printing dots to represent an image.

In Japanese Patent Application Laid-Open No. 61-285867 (Document 3), disclosed is a halftone image recording method where any one type of halftone dot screen is selected from a plurality of types of halftone dot screen having different shapes from one another, in accordance with a density band, hue band and coordinate band of an image.

In U.S. Pat. No. 6,532,082, disclosed is a halftone printing plate where a non-writing area is formed in halftone dot screen by a digital technique to improve printability.

In the case where the small ink droplets are frequently used in printing, banding unevenness easily appears in a range from middle to shadow of gray level in an image. On the other hand, in the case where the large droplets are frequently used, banding unevenness is suppressed but reproducibility of letters (text) and thin lines decreases.

In the method of generating a printing plate image in Document 2 and the multi-screening method in Document 3, measures to banding unevenness peculiar to the inkjet printer and switching of shape of halftone dot screen in order to improve quality of letters and thin lines are not considered. In Document 1, relationship between change of gray level in one image and dot diameter, and measures to banding unevenness are not considered also. Furthermore, in the case where the small droplets are frequently used and halftoning is performed with use of the error diffusion method as shown in Document 1, substantial resolution goes down.

SUMMARY OF INVENTION

The present invention is intended for an inkjet printer. It is an object of the present invention to perform appropriate printing in accordance with a classification of an original image such as natural image, tint, text or thin line while preventing deterioration of resolution.

The inkjet printer according to the present invention comprises: an inkjet head for forming dots having different sizes on a printing medium; a moving mechanism for moving the printing medium relatively to the inkjet head; a memory which stores a plurality of threshold matrix sets, a size of dot formed at each position on the printing medium being determined by comparing an original image with a threshold matrix set; and a controller for selecting a threshold matrix set in accordance with a classification of the original image and halftoning the original image; wherein each threshold matrix set included in the plurality of threshold matrix sets is a group of a plurality of threshold matrices corresponding to a plurality of sizes of dots, the largest size of formed dots becomes larger and an occupancy rate of dots having the largest size and an occupancy rate of all dots both increase in accordance with increase of gray level of the original image when comparing the original image with the each threshold matrix set, occupancy rates of all dots which correspond to a first threshold matrix set and a second threshold matrix set included in the plurality of threshold matrix sets, are different from each other in at least one part of a whole range of gray level and an occupancy rate of all dots corresponding to the first threshold matrix set becomes lower than or equal to that corresponding to the second threshold matrix set in a whole range of gray level. In the present invention, with use of the threshold matrices, it is possible to perform appropriate printing in accordance with the classification of the original image while preventing deterioration of resolution.

According to an aspect of the present invention, an occupancy rate of all dots corresponding to the first threshold matrix set is lower than 100 percent in the maximum value of gray level. According to another aspect of the present invention, a proportion of an occupancy rate of dots having the largest size to an occupancy rate of all dots with respect to the first threshold matrix set is higher than that with respect to the second threshold matrix set in a high range of gray level. In these cases, with use of the first threshold matrix set, it is possible to suppress banding unevenness.

According to a preferred embodiment of the present invention, an occupancy rate of all dots corresponding to the second threshold matrix set becomes 100 percent in a value of gray level lower than the maximum value of gray level. Thus, with use of the second threshold matrix set, it is possible to improve reproducibility of details in the printing image.

According to another preferred embodiment of the present invention, an occupancy rate of dots having the smallest size corresponding to the second threshold matrix set is higher than that corresponding to the first threshold matrix set in a middle range of gray level. Thus, with use of the second threshold matrix set, it is possible to improve reproducibility of details in the middle range of gray level.

Preferably, the original image when using the first threshold matrix set is a natural image or a tint image, or the original image when using the second threshold matrix set is a text image or a thin line image.

The present invention is also intended for an printing method of performing inkjet printing.

These and other objects, features, aspects and advantages of the present invention will become more apparent from the following detailed description of the present invention when taken in conjunction with the accompanying drawings.

DESCRIPTION OF EMBODIMENTS

Figure 1:
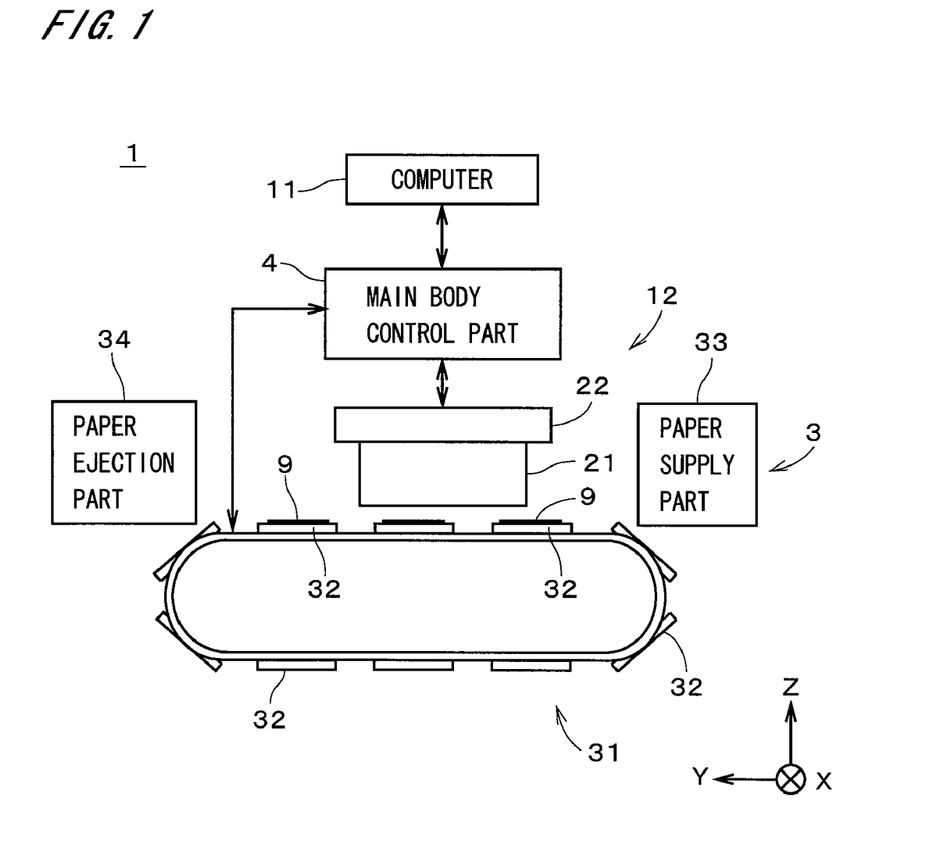
FIG. 1 is a view showing a constitution of an inkjet printer.

FIG. 1 is a view showing a constitution of a sheet-fed inkjet printer 1 in accordance with a preferred embodiment of the present invention. A main body 12 of the inkjet printer 1 comprises an inkjet head 21 for ejecting fine droplets of ink toward a printing paper 9, a head retracting mechanism 22 for retracting the inkjet head 21 in the X direction of FIG. 1, a paper feeding mechanism 3 which is a mechanism for moving the printing paper 9 toward the Y direction perpendicular to the X direction under the inkjet head 21, and a main body control part 4 which is connected to the inkjet head 21, the head retracting mechanism 22, and the paper feeding mechanism 3. A computer 11, which has a CPU for performing various computations, a memory for storing various information and so on, is connected to the main body control part 4. In the inkjet printer 1, the main body 12 receives a signal from the computer 11 and prints a halftone image (halftone dot image) in inkjet printing on the printing paper 9 which is a printing medium. The printing medium in the inkjet printer 1 may be a film, a thin metal plate or the like other than the printing paper 9.

The paper feeding mechanism 3 has two guide rails 31 which are loops each elongating in the Y direction and disposed in the X direction, a plurality of printing paper holders 32 which are disposed along the guide rails 31 at regular intervals, a paper supply part 33 disposed on the (−Y) side of the guide rails 31, and a paper ejection part 34 disposed on the (+Y) side of the guide rails 31. A not-shown belt is hanged on the guide rails 31 and the printing paper holders 32 are moved along the guide rails 31 by driving the belt with a motor. The printing paper holders 32 are moved to the (+Y) direction on the upper side of the guide rails 31 (on the inkjet head 21 side) and moved to the (−Y) direction on the lower side to circulate. Each printing paper holder 32 is supplied with a printing paper 9 from the paper supply part 33 when passing through the paper supply part 33, and the printing paper 9 is held on the printing paper holder 32 by suction. The printing paper 9 on which printing has been performed is collected by the paper ejection part 34 when the printing paper holder 32 passes through the paper ejection part 34.

A plurality of modules are arranged in the Y direction in the inkjet head 21 positioned above the paper feeding mechanism 3 and each module ejects ink of one color component. A plurality of outlets each of which ejects fine droplets of the ink toward the printing paper 9 (to the (−Z) direction in FIG. 1) are formed in the module and the plurality of outlets are arranged at a regular pitch with respect to the X direction. Each outlet of the inkjet head 21 can form (write) dots having different sizes (so-called multi-size dot) on the printing paper 9 by ejecting droplets having different amounts. In the present embodiment, any one dot of the smallest dot (hereinafter, referred to as a "small dot"), a larger dot than the small dot (hereinafter, the larger dot is referred to as a "medium dot") and a larger dot than the medium dot (hereinafter, the larger dot is referred to as a "large dot") can be formed at one formation position on the printing paper 9.

The inkjet printer 1 is a so-called single-pass printer and printing is performed by one-time passage of the inkjet head 21 to each position on the printing paper 9. In actual printing, the printing paper 9 is continuously moved in the (+Y) direction while the inkjet head 21 fixed at a printing position ejects ink.

In non-printing state, the inkjet head 21 is retracted to a predetermined home position by the head retracting mechanism 22, the outlets are covered with a cap member, and therefore the outlets is prevented from being blocked by dried ink in the vicinity of the outlets. Though the inkjet head 21 ejects ink of black (K), cyan (C), magenta (M), and yellow (Y) in the preferred embodiment, ink of other color components such as light cyan and light magenta may be ejected.

Figure 2:
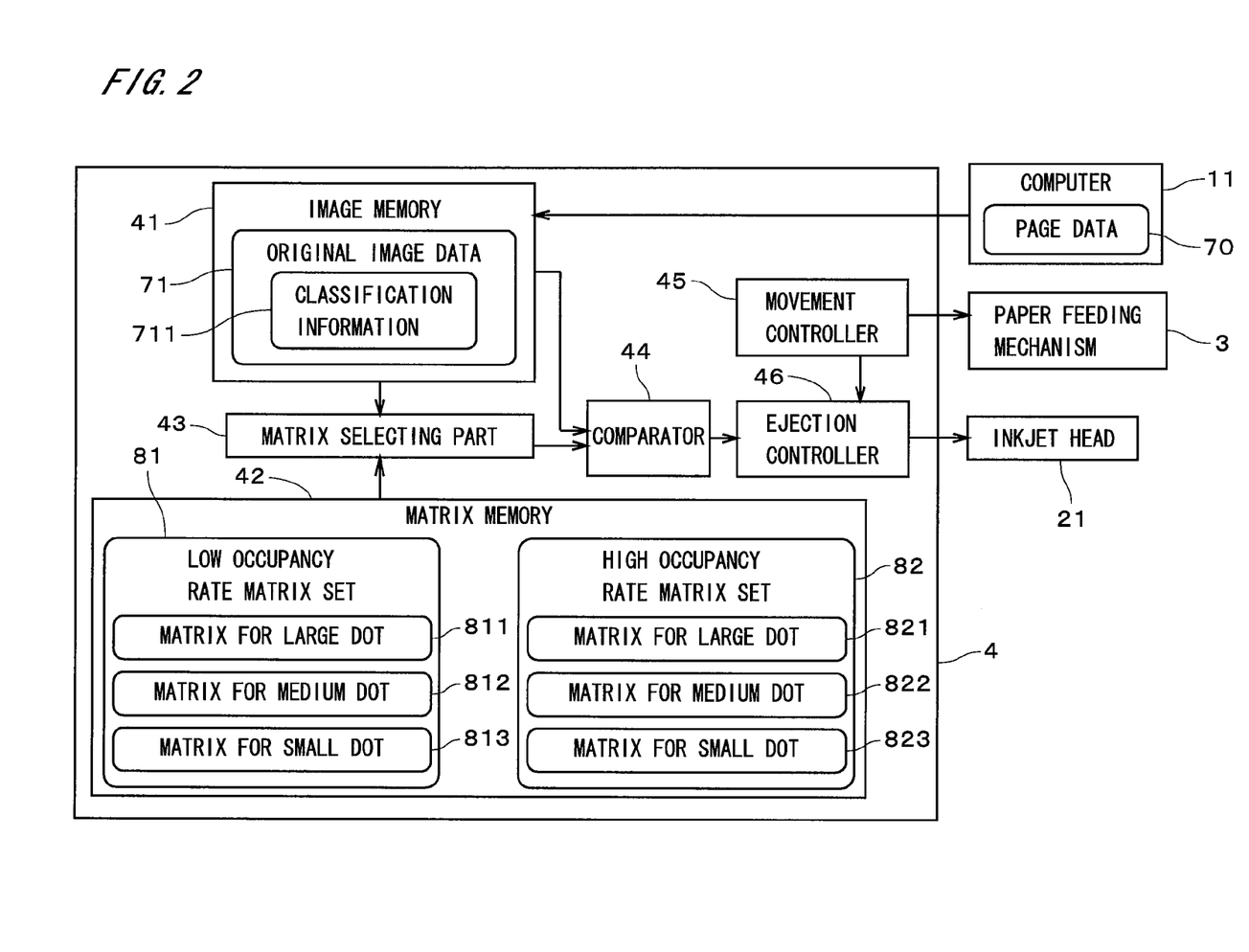
FIG. 2 is a block diagram showing a functional constitution of the inkjet printer.

FIG. 2 is a block diagram showing a functional constitution of the inkjet printer 1. The main body control part 4 comprises an image memory 41 for storing data of a color image (hereinafter, referred to as an "original image") to be halftoned, a matrix memory 42 (SPM (Screen Pattern Memory)) for storing a plurality of threshold matrix sets (i.e., a plurality of sets of threshold matrices) used in halftoning of the original image, a matrix selecting part 43 for selecting an appropriate threshold matrix set in accordance with the original image, a comparator 44 which is a halftoning circuit for comparing the original image with the threshold matrix for each color component, a movement controller 45 for controlling the paper feeding mechanism 3, and an ejection controller 46 for controlling ejection of ink from the inkjet head 21.

The original image is associated with a classification such as natural image, tint, text or thin line which shows a property of the image, and the original image is prepared as page data 70 in the computer 11. The page data 70 is made to be vector data or raster data in accordance with the classification. Though areas of various classifications are provided in the actual page data 70, hereinafter, it is supposed that only one classification is given to the page data 70 in order to simplify the following explanation.

Raster conversion in accordance with output resolution is performed on the page data 70 by the computer 11 as appropriate and the page data 70 is stored in the image memory 41 as data 71 where each pixel has pixel values of the plurality of color components (hereinafter, the data 71 is referred to as "original image data 71"). The original image data 71 includes classification information 711 indicating the classification of the original image.

Two threshold matrix sets are stored in the matrix memory 42 and each threshold matrix set (i.e., each set of threshold matrices) is used for FM (Frequency Modulated) screening where gray level is represented by changing the number of dots irregularly disposed. In the two threshold matrix sets, as described later, proportions of positions where dot formation is actually performed, to all positions where dots can be formed (hereinafter, the proportions are referred to as "occupancy rates") in respective values of gray level are different from one another in principle. Hereinafter, a first threshold matrix set is referred to as a "low occupancy rate matrix set 81" and a second threshold matrix set is referred to as a "high occupancy rate matrix set 82".

A plurality of threshold matrices (three threshold matrices in the present embodiment) included in each of the low occupancy rate matrix set 81 and the high occupancy rate matrix set 82 correspond to a plurality of sizes of dots. The low occupancy rate matrix set 81 includes a matrix 811 for the large dot which is a threshold matrix for the large dot, a matrix 812 for the medium dot which is a threshold matrix for the medium dot and a matrix 813 for the small dot which is a threshold matrix for the small dot. The high occupancy rate matrix set 82 also includes a matrix 821 for the large dot, a matrix 822 for the medium dot and a matrix 823 for the small dot. Although FIG. 2 shows one low occupancy rate matrix set 81 and one high occupancy rate matrix set 82, a low occupancy rate matrix set and a high occupancy rate matrix set are prepared for each of the other color components.

Figure 3:
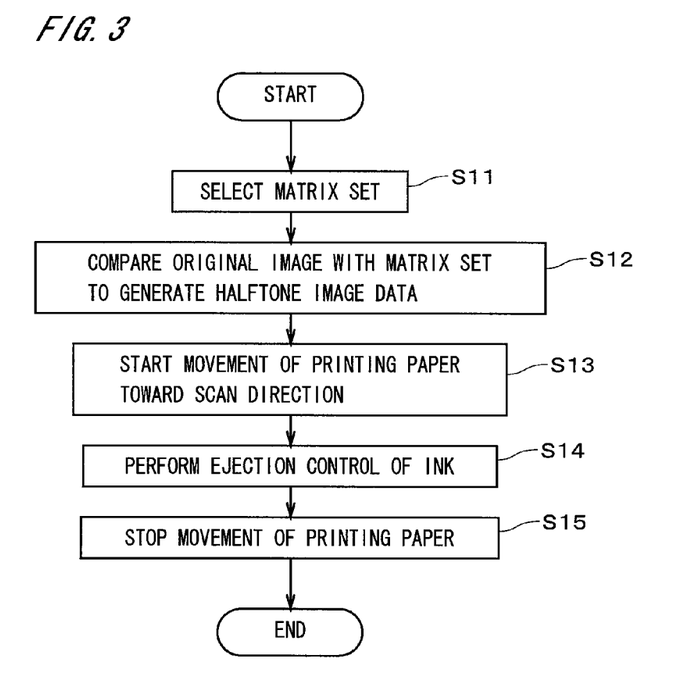
FIG. 3 is a flowchart showing an operation flow for printing by the inkjet printer.

Next, discussion will be made on printing operation of the inkjet printer 1 with reference to FIG. 3. FIG. 3 shows an operation flow for printing with focus on one printing paper 9.

When performing printing in the inkjet printer 1, first, the classification information 711 of the original image data 71 is inputted to the matrix selecting part 43 as shown in FIG. 2, and any one of the low occupancy rate matrix set 81 and the high occupancy rate matrix set 82 (hereinafter, the selected one is simply referred to as a "matrix set") is selected in accordance with the classification information 711 by the matrix selecting part 43 (Step S11). Though the following discussion will be made on only the matrix set for one color component out of four matrix sets prepared for the four color components, i.e., black, cyan, magenta and yellow, respectively, the same process is applied for the matrix set for each of the other color components.

In the comparator 44, pixel values of respective pixels which the original image data 71 shows are compared with threshold values which the selected matrix set have, and therefore the original image is halftoned (i.e., half-tone dot meshing is performed), to generate halftone image data to be used for printing (Step S12).

Figure 4:
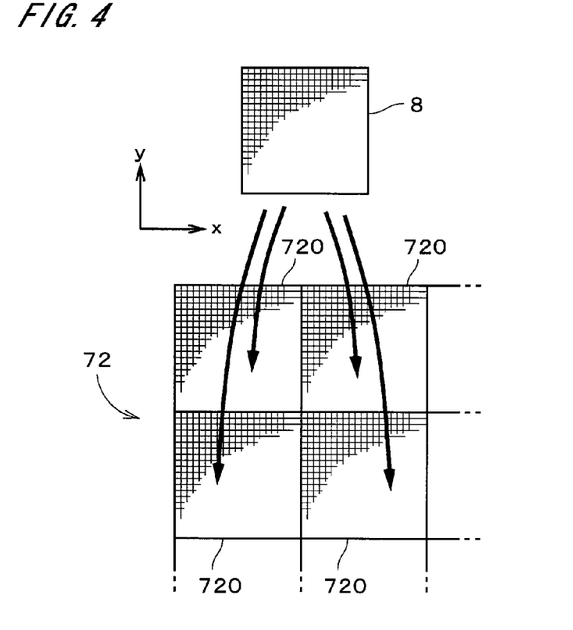
FIG. 4 is a view conceptually showing an original image and a threshold matrix.

Here, halftoning of the original image will be discussed. FIG. 4 is a view conceptually showing an original image 72 and a threshold matrix. In FIG. 4, one threshold matrix out of three threshold matrices which are the matrix set is shown with a reference sign 8. In the threshold matrix 8, a plurality of elements are arranged in a row direction corresponding to the width direction of the printing paper 9 (the row direction is shown as the x direction in FIG. 4) and a column direction corresponding to the scan direction (the column direction is shown as the y direction in FIG. 4). Also in the original image 72, a plurality of pixels are arranged in the row direction and the column direction. In the following description, the original image 72 is represented by values of gray level from 0 to 255 (i.e., the values one of which can be assigned to each pixel as a pixel value).

In halftoning of the original image 72, as shown in FIG. 4, the original image 72 is divided into a large number of areas having the fixed size and repeat areas 720 each of which serves as a unit in halftoning are set. The matrix memory 42 has a memory area corresponding to one repeat area 720 and a threshold value is set to each address (coordinates) of the memory area to store the threshold matrix 8. Conceptually, each repeat area 720 of the original image 72 and the threshold matrix 8 for each color component are superposed and a pixel value of each pixel in the repeat area 720 is compared with a threshold value in the threshold matrix 8 corresponding to the pixel value. Comparison between the pixel value and the threshold value is performed for each of the three threshold matrices (i.e., the matrix set) corresponding to dot sizes, to thereby determine whether dot formation (formation of a dot) should be performed on the position of the pixel on the printing paper 9 and which size of dot should be formed.

Actually, a pixel value of one pixel in the original image 72 is read out from the image memory 41 on the basis of an address signal outputted from an address generator of the comparator 44 in FIG. 2. An address signal representing a position in the repeat area 720 corresponding to the pixel is also generated in the address generator, three threshold values in the matrix set are specified and read out from the matrix memory 42. The pixel value and the three threshold values are compared in the comparator 44, to sequentially determine a dot size of position of each pixel (i.e., the position is a formation position) in a halftone image which is an output image.

Out of the three threshold values, the largest value is in the matrix for the large dot and the smallest value is in the matrix for the small dot. First, the pixel value in the original image (hereinafter, the pixel value is referred to as an "input pixel value") is compared with the threshold value in the matrix for the large dot. When the input pixel value is larger than the threshold value, the corresponding pixel in the halftone image is assigned the value "3". Hereinafter, the pixel value in the halftone image is referred to as a "halftone pixel value". In the case where the input pixel value is equal to or smaller than the threshold value in the matrix for the large dot, the input pixel value is compared with the threshold value in the matrix for the medium dot. When the input pixel value is larger than the threshold value in the matrix for the medium dot, the corresponding position in the halftone image is assigned the halftone pixel value "2". In the case where the input pixel value is equal to or smaller than the threshold value in the matrix for the medium dot, the input pixel value is compared with the threshold value in the matrix for the small dot. When the input pixel value is larger than the threshold value in the matrix for the small dot, the corresponding position in the halftone image is assigned the halftone pixel value "1". In the case where the input pixel value is equal to or smaller than the threshold value in the matrix for the small dot, the corresponding position in the halftone image is assigned the halftone pixel value "0".

In the inkjet printer 1, when the halftone image data, which is a set of halftone pixel values of each color component, of a part to be first printed is generated, the paper feeding mechanism 3 is driven by the movement controller 45, and therefore movement of the printing paper 9 toward the scan direction is started (Step S13). In parallel with generation of the halftone image data, ejection of ink from the plurality of outlets in the inkjet head 21 is controlled by the ejection controller 46 in synchronization with movement of the printing paper 9 (Step S14).

The position in the X direction of each pixel in the halftone image is associated with any one outlet. When a halftone pixel value corresponding to an ejection position (i.e., a position of pixel) on the printing paper 9 which comes below an outlet is "3", a large dot is formed at the ejection position. A medium dot is formed when the halftone pixel value is "2", and a small dot is formed when the halftone pixel value is "1". A dot is not formed at the ejection position when the halftone pixel value is "0".

The above operation is performed with respect to each of black, cyan, magenta and yellow, and therefore a color halftone image representing the color original image is printed on the printing paper 9.

As already described, the printing papers 9 are sequentially supplied by the paper supply part 33, and after printing they are collected by the paper ejection part 34. After the whole halftone image is printed on each of the desired numbers of printing papers 9, supply of printing paper 9 is stopped and the printing operation is completed (Step S15).

Figure 5:
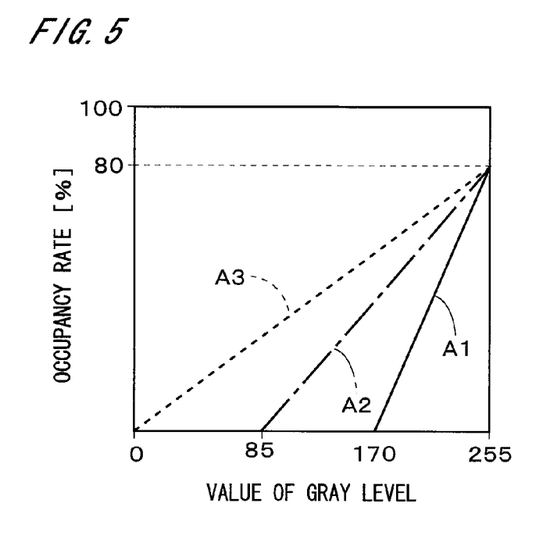
FIG. 5 is a view showing a characteristic of a low occupancy rate matrix set.

Next, discussion will be made on a characteristic of the matrix set. FIG. 5 is a view showing a characteristic of the low occupancy rate matrix set 81. In FIG. 5, the vertical axis shows the occupancy rate (i.e., it is a proportion of the number of dots to all positions where dots can be formed and it is also considered as a writing rate) in the case where an original image having uniform values (pixel values) of gray level is printed with use of the low occupancy rate matrix set 81 in the inkjet printer 1 and the horizontal axis shows the value of gray level of the original image. Also in FIG. 5, the occupancy rate of only the large dots is shown by a solid line denoted by a reference sign A1, the sum of the occupancy rate of the large dots and the occupancy rate of the medium dots is shown by a chain line denoted by a reference sign A2 and the occupancy rate of dots of all sizes is shown by a dotted line denoted by a reference sign A3.

A range of threshold values included in the matrix 811 for the large dot is from 170 to 255, a range of threshold values included in the matrix 812 for the medium dot is from 85 to 255 and a range of threshold values included in the matrix 813 for the small dot is from 0 to 255. As already described, out of threshold values of positions corresponding to one another in the three threshold matrix included in the low occupancy rate matrix set 81, the smallest value is in the matrix 813 for the small dot and the largest value is in the matrix 811 for the large dot. When a large dot or a medium dot is formed at a position, a smaller dot than it is not formed at the position although the input pixel value is higher than the threshold value. With respect to a position assigned the threshold value "255" in all threshold matrices, ejection of ink from the outlet is not performed even if the input pixel value is the maximum value of gray level. Hereinafter, the pixel of the position in the halftone image is referred to as a "sleep element".

As shown in FIG. 5, the occupancy rate of only the small dots linearly increases as shown by the dotted line A3 in accordance with increase of gray level of the original image from 0 to 85. In increase of gray level from 85 to 170, the occupancy rate of all dots (small dots and medium dots) linearly increases as shown by the dotted line A3, the occupancy rate of the medium dots linearly increases as shown by the chain line A2 and the occupancy rate of the small dots gradually decreases. In increase of gray level from 170 to 255, the occupancy rate of all dots (small dots, medium dots and large dots) linearly increases as shown by the linear line A3, the occupancy rate of the large dots linearly increases as shown by the linear line A1 and the occupancy rate of the small dots and the occupancy rate of the medium dots both gradually decrease. As above, the largest size of formed dots becomes larger (i.e., a size of largest dot out of formed dots changes to a larger size) in accordance with increase of gray level of the original image and a proportion of smaller dots to all dots decreases in accordance with increase of a proportion of larger dots. In halftoning with use of the low occupancy rate matrix set 81, even if the values of gray level of the original image are maximum, the occupancy rate of all dots is made to be 80% (percent), and pixels included in the remaining 20% are sleep elements, that is, white pixels (i.e., the pixels remaining white).

In generation of the threshold matrix corresponding to each dot size, for example, an original threshold matrix is generated by the method disclosed in Japanese Patent Application Laid-Open No. 2008-199154, and the disclosure of which is herein incorporated by reference. A range of threshold values is narrowed as appropriate and a certain offset value is added to each threshold value so that the minimum threshold value meets a value of gray level where dot of the size appears first.

Figure 6:
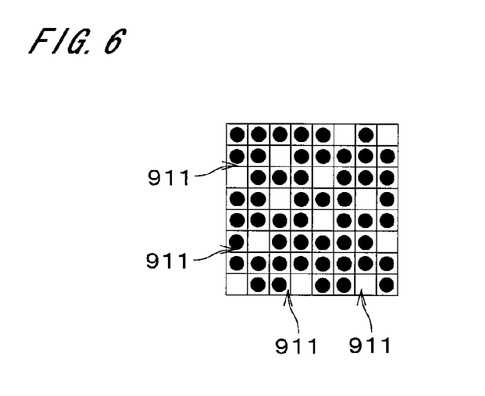
FIG. 6 is a view showing an example of tint image written with use of the low occupancy rate matrix set.
Figure 7:
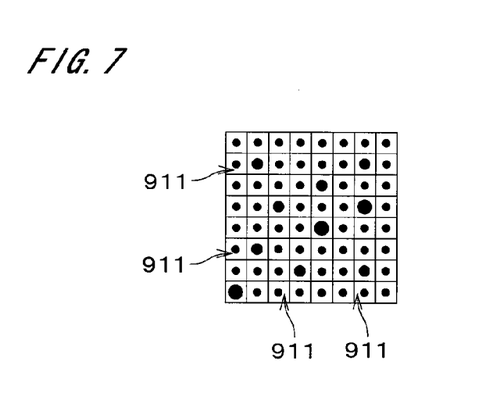
FIG. 7 is a view showing a tint image of a comparative example.

FIG. 6 is a view showing an example of a part of tint image which corresponds to a high value of gray level and is written with use of the low occupancy rate matrix set 81. FIG. 7 is a view showing an example of a part of tint image which corresponds to a high value of gray level and is written with use of a comparative example of matrix set. In the comparative example of matrix set, the occupancy rate of all dots is 100% at a maximum and a proportion of the small dots to all dots formed at a value of gray level is higher than that at the same value of gray level in the low occupancy rate matrix set 81. An area 911 to which each dot is disposed in the tint images shown in FIGS. 6 and 7 is shown by a rectangle of thin line (the same applies to FIGS. 9 and 10). In the tint image of FIG. 6, since the low occupancy rate matrix set 81 is used, a proportion of the large dots is high and white areas are formed by the sleep elements. As the result, banding unevenness is suppressed. On the other hand, in the tint image of FIG. 7, since a proportion of the small dots is high and spaces between dots become large, banding unevenness easily appears in printing.

Figure 8:
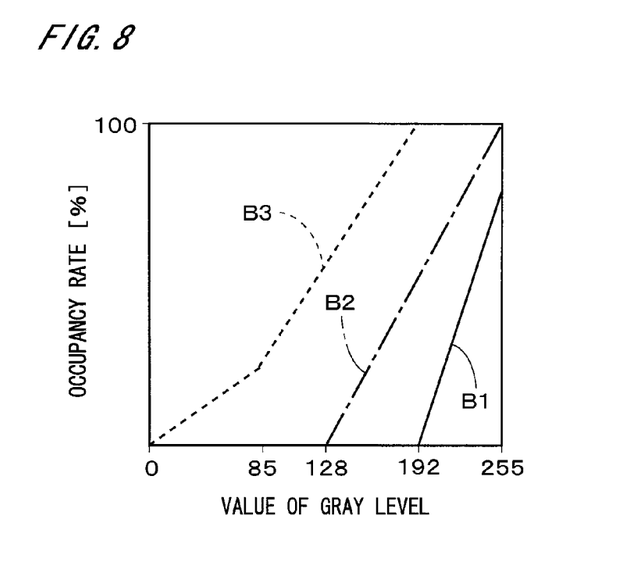
FIG. 8 is a view showing a characteristic of a high occupancy rate matrix set.

FIG. 8 is a view showing a characteristic of the high occupancy rate matrix set 82. The vertical axis shows the occupancy rate and the horizontal axis shows the value of gray level of the original image in the same way as FIG. 5. In FIG. 8, the occupancy rate of only the large dots is shown by a solid line denoted by a reference sign B1, the sum of the occupancy rates of the large dots and the medium dots is shown by a chain line denoted by a reference sign B2 and the occupancy rate of dots of all sizes is shown by a dotted line denoted by a reference sign B3.

A range of threshold values included in the matrix 821 for the large dot is from 192 to 255, a range of threshold values included in the matrix 822 for the medium dot is from 128 to 254 and a range of threshold values included in the matrix 823 for the small dot is from 0 to 254. Out of threshold values of positions corresponding to one another in the three threshold matrix included in the high occupancy rate matrix set 82, the smallest value is in the matrix 823 for the small dot and the largest value is in the matrix 821 for the large dot. When a large dot or a medium dot is formed at a position, a smaller dot than it is not formed at the position although the input pixel value is higher than the threshold value.

As shown in FIG. 8, the occupancy rate of only the small dots linearly increases as shown by the dotted line B3 in accordance with increase of gray level of the original image from 0 to 85. In increase of gray level from 85 to 128, the occupancy rate of the small dots linearly increases along the slope which is larger than that in the range of gray level from 0 to 85. In increase of gray level from 128 to 192, the occupancy rate of all dots (small dots and medium dots) linearly increases as shown by the dotted line B3, the medium dots linearly increases as shown by the chain line B2 and the occupancy rate of the small dots gradually decreases. In increase of gray level from 192 to 255, the occupancy rate of all dots (small dots, medium dots and large dots) is consistently 100%, the large dots linearly increases as shown by the linear line B1 and the number of the small dots and the number of the medium dots both gradually decrease. When a value of gray level is 255, the occupancy rate of the large dots is 80%, the occupancy rate of the medium dots is 20% and the occupancy rate of the small dots is 0%. As above, also in the high occupancy rate matrix set 82, the largest size of formed dots becomes larger in accordance with increase of gray level of the original image and a proportion of smaller dots to all dots decreases in accordance with increase of a proportion of larger dots.

As shown in FIGS. 5 and 8, the occupancy rate of all dots shown by the dotted line B3 in the high occupancy rate matrix set 82 becomes higher than or equal to the corresponding occupancy rate of all dots shown by the dotted line A3 in the low occupancy rate matrix set 81 in a whole range of gray level (except the value 0 of gray level). And also the occupancy rate of the small dots in the high occupancy rate matrix set 82 is higher than the occupancy rate of the small dots in the low occupancy rate matrix set 81 in a middle range of gray level (i.e., the range of medium values of gray level). The middle range of gray level is, for example a range from 85 to 192 and preferably a range whose width is 30% of the whole range of gray level and whose center lies on the midst of the whole range.

Furthermore, a proportion of the occupancy rate of the large dots to the occupancy rate of all dots with respect to the low occupancy rate matrix set 81 is higher than a proportion of the occupancy rate of the large dots to the occupancy rate of all dots with respect to the high occupancy rate matrix set 82 in a high range of gray level (i.e., the range of large values of gray level). The high range of gray level is a range which lies in the vicinity of the maximum value of gray level and which includes the maximum value of gray level, and preferably a range whose width is 20% of the whole range of gray level.

Figure 9:
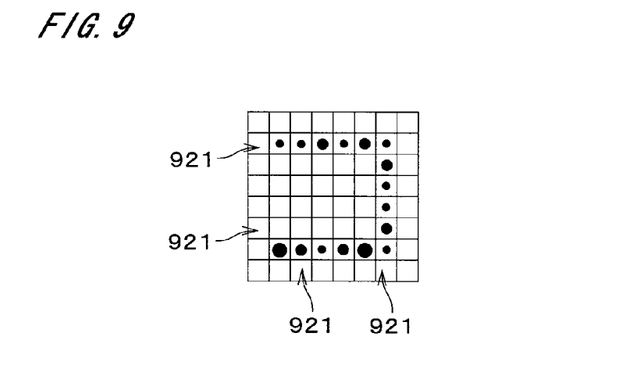
FIG. 9 is a view showing an example of thin line image written with use of the high occupancy rate matrix set.
Figure 10:
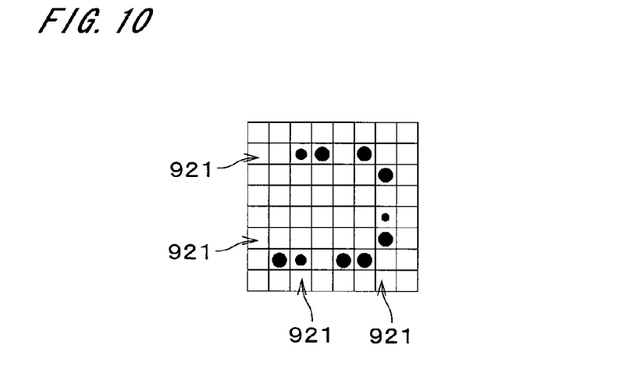
FIG. 10 is a view showing a thin line image of a comparative example.

FIG. 9 is a view showing an example of a part of thin line image written with use of the high occupancy rate matrix set 82. FIG. 10 is a view showing an example of a part of thin line image written with use of a comparative example of matrix set. In the comparative example of matrix set, a proportion of the small dots to all dots formed at a value of gray level is lower than that at the same value of gray level in the high occupancy rate matrix set 82. In the thin line image of FIG. 9, since the high occupancy rate matrix set 82 is used, a proportion of the small dots is high and white areas are suppressed by high occupancy rate. As the result, jaggies (jagged edge) and missing line are suppressed and therefore reproducibility of details is improved. On the other hand, in the thin line image shown in FIG. 10, since a proportion of the large dots is high and white areas easily appears (areas remaining white easily occur), jaggies and missing line arise.

In the matrix selecting part 43 of the inkjet printer 1, in order to utilize the above characteristics of the low occupancy rate matrix set 81 and the high occupancy rate matrix set 82, the low occupancy rate matrix set 81 is selected when the classification information 711 of the original image indicates a tint image or a natural image (preferably a natural image whose spatial frequency is low) and therefore banding unevenness is reduced. When the classification information 711 indicates a thin line image or a text image, the high occupancy rate matrix set 82 is selected to suppress jaggies and missing line. Though the low occupancy rate matrix set 81 is usually used for the natural image, it is preferable to select the high occupancy rate matrix set 82 for a natural image showing trees, an architectural structure or the like whose spatial frequency is higher than that of the usual natural image.

The tint image is an image largely containing filled parts (daubed areas) and it is not limited to an image where the whole is covered with ink. The text image is an image containing many letters and it is not limited to an image which contains only letters. The thin line image is an image containing many thin lines and it is not limited to an image which contains only thin lines.

As described above, in the inkjet printer 1 in accordance with the preferred embodiment, the occupancy rate of multi-size dots is controlled by halftoning with use of the low occupancy rate matrix set 81 and the high occupancy rate matrix set 82, and it is therefore possible to perform appropriate printing in accordance with the classification and the values of gray level of the original image while preventing deterioration of resolution in comparison with the error diffusion method. Though banding unevenness easily appears especially in the single-pass printer, banding unevenness can be suppressed by using the low occupancy rate matrix set 81 even in such a printer.

Furthermore, the occupancy rate of all dots corresponding to the high occupancy rate matrix set 82 becomes 100% in a value of gray level lower than the maximum value of gray level, and it is therefore possible to improve reproducibility of details and smoothness of edges in the printed image. Especially in the high occupancy rate matrix set 82, since the small dots are frequently used (i.e., many small dots exist in the printed image) in a middle range of gray level, it is therefore possible to improve reproducibility of details.

Figure 11:
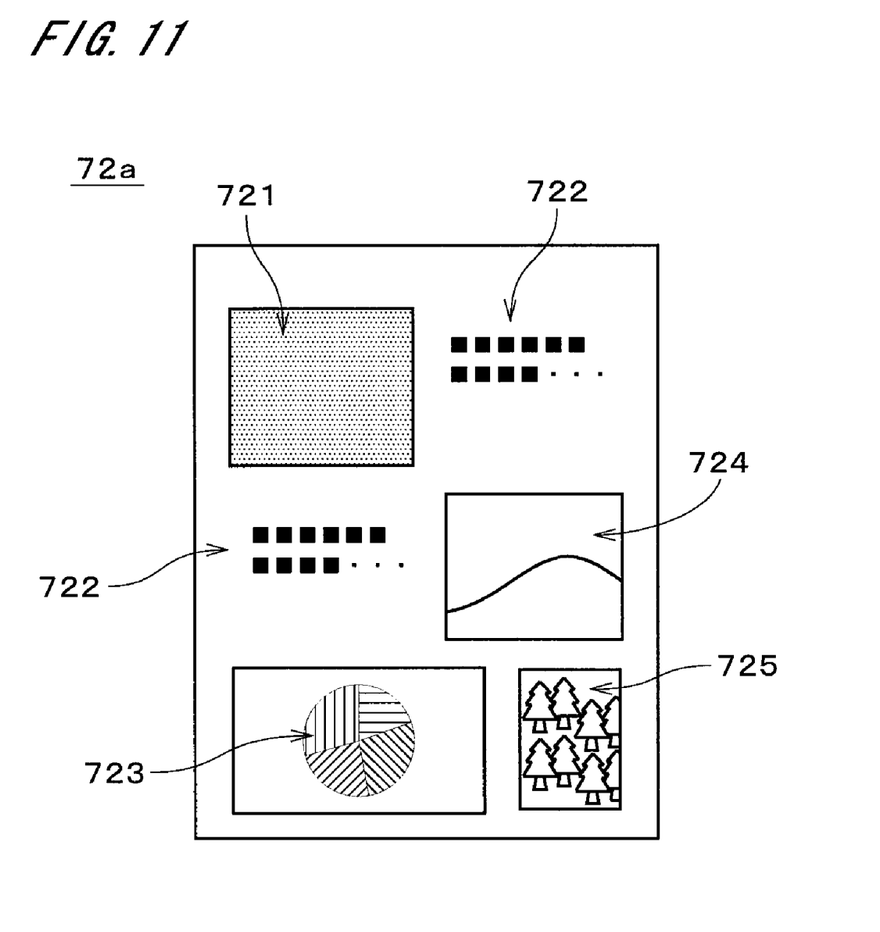
FIG. 11 is a view showing an example of original image.

FIG. 11 is a view showing another example of original image. The original image 72a is a set of a plurality of image areas having different classifications and it contains a tint area 721 which is a tint image, text areas 722 which are text images, a thin line area 723 which is a thin line image and natural image areas 724, 725 which are natural images. The natural image area 724 is an area (hereinafter, referred to as a "first natural image area") of image showing sky, sea or the like whose spatial frequency is low and the natural image area 725 is an area (hereinafter, referred to as a "second natural image area") of image showing trees, an architectural structure or the like whose spatial frequency is higher than that of the first natural image area 724. The image areas are not limited to rectangles and they may be various shapes and sizes.

In page data of the original image 72a, each of the tint area 721, the text areas 722 and the thin line area 723 is vector data and each of the first natural image area 724 and the second natural image area 725 is raster data such as bit map data.

Figure 12:
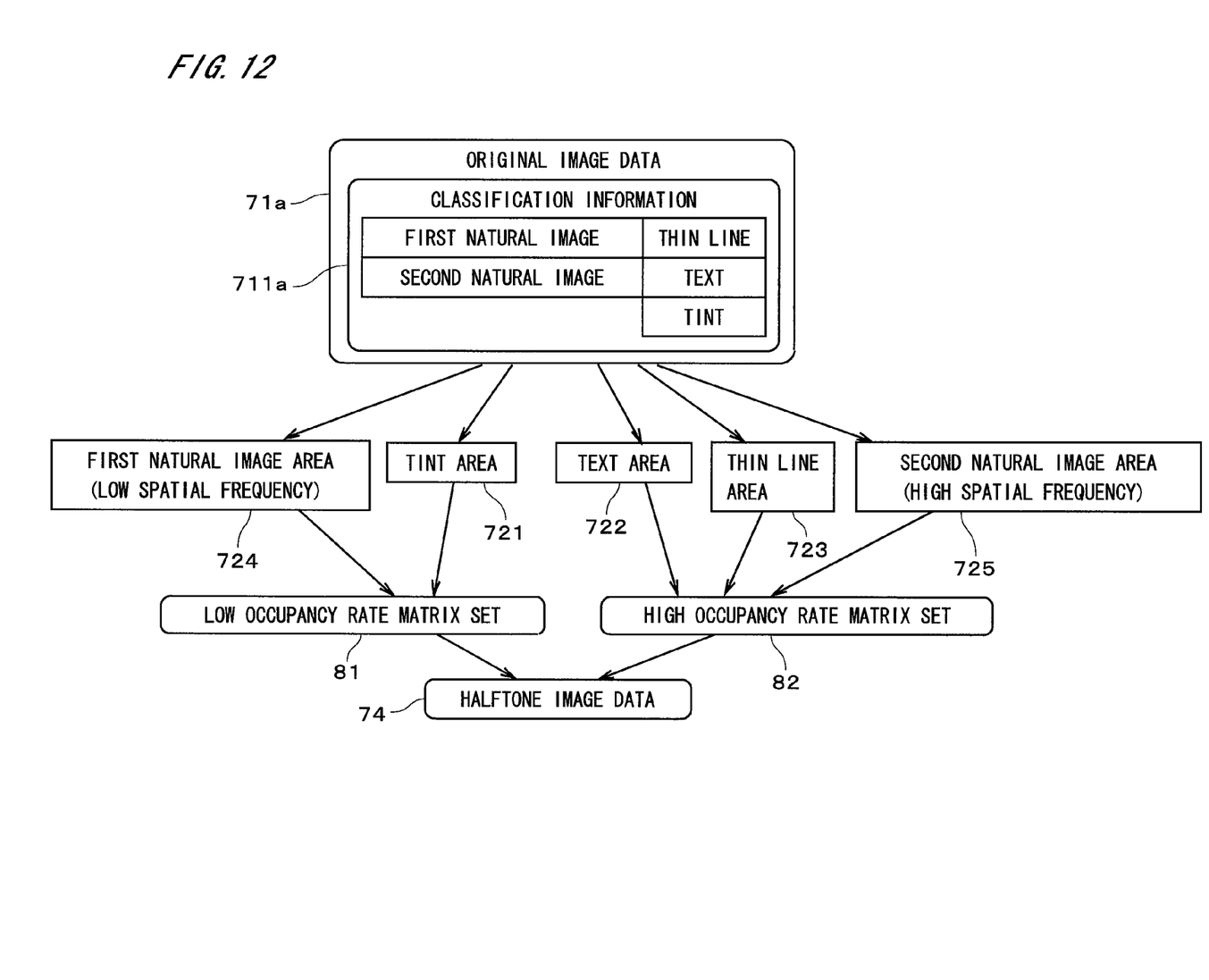
FIG. 12 is a view showing generation of halftone image data.

FIG. 12 is a view showing generation of halftone image data. In the computer 11 shown in FIG. 2, parts of vector data in page data 70 representing the original image 72a are raster-converted and parts of raster data are resolution-converted as appropriate, to generate original image data 71a which is a set of raster data of respective areas. The original image data 71a includes information indicating layout of respective image areas and classification information 711a indicating the classifications of respective image areas.

Operation of the inkjet printer 1 in accordance with the original image data 71a is different from operation shown in FIG. 3 in the point where Steps S11 and S12 are conceptually performed for each image area, and the other operation is identical to the operation of FIG. 3. That is, as shown in FIG. 12, the low occupancy rate matrix set 81 is used in halftoning of the tint area 721 and the first natural image area 724, and the high occupancy rate matrix set 82 is used in halftoning of the text areas 722, the thin line area 723 and the second natural image area 725. And halftoned image areas are unified to generate halftone image data 74 for printing. As above, each image area in the original image 72a is treated as a partial original image having one classification in the inkjet printer 1.

In actual operation of the inkjet printer 1, every time when a pixel value of one color component of one pixel in the original image data 71a is inputted to the comparator 44 from the image memory 41, the classification information 711a to which the pixel belongs is inputted to the matrix selecting part 43 and three threshold values in a selected matrix set which correspond to the pixel are inputted to the comparator 44. Therefore, halftoning of respective image areas and unification of the image areas are substantially performed.

In also printing of the original image 72a, the occupancy rate of multi-size dots is controlled with use of the low occupancy rate matrix set 81 and the high occupancy rate matrix set 82, and it is therefore possible to perform appropriate printing in accordance with the classifications and the values of gray level of the original image while preventing deterioration of resolution. For the tint area 721 and the first natural image area 724 whose spatial frequency is low, banding unevenness can be suppressed by using the low occupancy rate matrix set 81. For the text areas 722, the thin line area 723 and the second natural image area 725 whose spatial frequency is high, reproducibility of details can be improved by using the high occupancy rate matrix set 82.

Though the preferred embodiments of the present invention have been discussed above, the present invention is not limited to the above-discussed preferred embodiments, but allows various variations.

For example, though the low occupancy rate matrix set 81 and the high occupancy rate matrix set 82 are prepared as the plurality of threshold matrix sets in the above preferred embodiments, more threshold matrix sets than two may be prepared. When comparing the original image with each threshold matrix set in this case, the largest size of formed dots becomes larger in accordance with increase of gray level of the original image. In the each threshold matrix set, an occupancy rate of dots having the largest size out of existing dots increases and an occupancy rate of all dots also increases in accordance with increase of gray level of the original image in a similar fashion to the above preferred embodiments.

Furthermore, out of any two threshold matrix sets included in the plurality of threshold matrix sets, an occupancy rate of all dots corresponding to one threshold matrix set becomes lower than or equal to that corresponding to the other threshold matrix set in a whole range of gray level, to clarify the difference of characteristic of each threshold matrix set from one another. It is preferred that occupancy rates of all dots which correspond to the two threshold matrix sets are different from each other in at least one part of a whole range of gray level, so that the difference between the two threshold matrix sets is further clarified.

The number of dot sizes which the inkjet head 21 can form (record) is not limited to three and it may be 2 or more than 3.

The low occupancy rate matrix set 81 and the high occupancy rate matrix set 82 may be other than those shown in FIGS. 5 and 8. In the above preferred embodiments, the occupancy rate of all dots corresponding to the low occupancy rate matrix set 81 is lower than 100 percent in the maximum value of gray level to cause areas remaining white.

Here, the maximum occupancy rate of all dots corresponding to the low occupancy rate matrix set 81 may be other than that shown in FIG. 5 and it is preferably made to be equal to or more than 50%. In also the high occupancy rate matrix set 82, the occupancy rate of all dots may be other than a polygonal line shown by the dotted line B3 and be for example a straight line. The proportion of the large dots in the high occupancy rate matrix set 82 may be 100% in the maximum value of gray level.

In halftoning with use of the threshold matrix, AM (Amplitude Modulated) screening where gray level is represented by changing sizes of clusters each of which is a group of dots and which are regularly arranged, may be used. In the case where a low occupancy rate matrix set of AM screening is used, sleep elements which are areas remaining white are set between adjacent halftone dots (i.e., clusters of dots) or at the insides of halftone dots even in the maximum value of gray level. In this case, a halftone dot is formed by small dots in a low range of gray level. In accordance with increase of gray level, a proportion of large dots increases and small dots are disposed around the large dots. In the case where a high occupancy rate matrix set is used, spaces between the halftone dots are filled with small dots in a value of gray level lower than the maximum value of gray level.

In the inkjet printer 1, generation of the original image data and printing operation need not be performed in parallel. And printing operation may be started after generation of the halftone image data for the whole original image is completed, if a sufficiently large memory can be provided in the main body control part 4.

Though the printing paper 9 is moved in the Y direction in the state where a position of the inkjet head 21 is fixed in the above preferred embodiments, shuttle type printing where the inkjet head ejects ink while being reciprocated in the X direction may be performed. In this case, single-pass printing where the inkjet head 21 passes through each position on the printing paper 9 once may be employed. The inkjet head may be moved relatively to a printing medium in the inkjet printer 1.

The inkjet printer 1 is not limited to a sheet-fed type and a web of continuous (band like) paper, film, thin metal plate or the like may be used as a printing medium.

While the invention has been shown and described in detail, the foregoing description is in all aspects illustrative and not restrictive. It is therefore understood that numerous modifications and variations can be devised without departing from the scope of the invention. This application claims priority benefit under 35 U.S.C. Section 119 of Japanese Patent Application No. 2009-72470 filed in the Japan Patent Office on Mar. 24, 2009, the entire disclosure of which is incorporated herein by reference.

REFERENCE SIGNS LIST 1 inkjet printer
3 paper feeding mechanism
4 main body control part
8 threshold matrix
9 printing paper
21 inkjet head
42 matrix memory
71, 71a original image data
72, 72a original image
81 low occupancy rate matrix set
82 high occupancy rate matrix set
711, 711a classification information
721 tint area
722 text area
723 thin line area
724 first natural image area 725 second natural image area
811, 821 matrix for the large dot
812, 822 matrix for the medium dot
813, 823 matrix for the small dot
S11 to S15 step

The invention claimed is:

1. An inkjet printer, comprising:
an inkjet head for forming dots having different sizes on a printing medium;
a moving mechanism for moving said printing medium relatively to said inkjet head;
a memory which stores a plurality of threshold matrix sets, a size of dot formed at each position on said printing medium being determined by comparing an original image with a threshold matrix set; and
a controller for selecting a threshold matrix set in accordance with a classification of said original image and halftoning said original image; wherein
each threshold matrix set included in said plurality of threshold matrix sets is a group of a plurality of threshold matrices corresponding to a plurality of sizes of dots,
the largest size of formed dots becomes larger and an occupancy rate of dots having the largest size and an occupancy rate of all dots both increase in accordance with increase of gray level of said original image when comparing said original image with said each threshold matrix set,
occupancy rates of all dots which correspond to a first threshold matrix set and a second threshold matrix set included in said plurality of threshold matrix sets, are different from each other in at least one part of a whole range of gray level and an occupancy rate of all dots corresponding to said first threshold matrix set becomes lower than or equal to that corresponding to said second threshold matrix set in a whole range of gray level.

2. The inkjet printer according to claim 1, wherein
an occupancy rate of all dots corresponding to said first threshold matrix set is lower than 100 percent in the maximum value of gray level.

3. The inkjet printer according to claim 1, wherein
an occupancy rate of all dots corresponding to said second threshold matrix set becomes 100 percent in a value of gray level lower than the maximum value of gray level.

4. The inkjet printer according to claim 1, wherein
a proportion of an occupancy rate of dots having the largest size to an occupancy rate of all dots with respect to said first threshold matrix set is higher than that with respect to said second threshold matrix set in a high range of gray level.

5. The inkjet printer according to claim 1, wherein
an occupancy rate of dots having the smallest size corresponding to said second threshold matrix set is higher than that corresponding to said first threshold matrix set in a middle range of gray level.

6. The inkjet printer according to claim 1, wherein
said original image when using said first threshold matrix set is a natural image or a tint image.

7. The inkjet printer according to claim 1, wherein
said original image when using said second threshold matrix set is a text image or a thin line image.

8. The inkjet printer according to claim 1, wherein
said first threshold matrix set is used for a first natural image and said second threshold matrix set is used for a second natural image whose spatial frequency is higher than that of said first natural image.

9. The inkjet printer according to claim 1, wherein
printing is performed by one-time passage of said inkjet head to each position on said printing medium.

10. A printing method of performing inkjet printing, comprising the steps of:
a) selecting a threshold matrix set from a plurality of threshold matrix sets in accordance with a classification of an original image;
b) determining a size of dot formed at each position on a printing medium by comparing said original image with each threshold matrix included in said threshold matrix set, to halftone said original image; and
c) performing printing on said printing medium by moving said printing medium relatively to an inkjet head for forming dots having different sizes; wherein
the largest size of formed dots becomes larger and an occupancy rate of dots having the largest size and an occupancy rate of all dots both increase in accordance with increase of gray level of said original image when comparing said original image with each threshold matrix set included in said plurality of threshold matrix sets,
occupancy rates of all dots which correspond to a first threshold matrix set and a second threshold matrix set included in said plurality of threshold matrix sets, are different from each other in at least one part of a whole range of gray level and an occupancy rate of all dots corresponding to said first threshold matrix set becomes lower than or equal to that corresponding to said second threshold matrix set in a whole range of gray level.

11. The printing method according to claim 10, wherein
an occupancy rate of all dots corresponding to said first threshold matrix set is lower than 100 percent in the maximum value of gray level.

12. The printing method according to claim 10, wherein
an occupancy rate of all dots corresponding to said second threshold matrix set becomes 100 percent in a value of gray level lower than the maximum value of gray level.

13. The printing method according to claim 10, wherein
a proportion of an occupancy rate of dots having the largest size to an occupancy rate of all dots with respect to said first threshold matrix set is higher than that with respect to said second threshold matrix set in a high range of gray level.

14. The printing method according to claim 10, wherein
an occupancy rate of dots having the smallest size corresponding to said second threshold matrix set is higher than that corresponding to said first threshold matrix set in a middle range of gray level.

15. The printing method according to claim 10, wherein
said original image when using said first threshold matrix set is a natural image or a tint image.

16. The printing method according to claim 10, wherein
said original image when using said second threshold matrix set is a text image or a thin line image.

17. The printing method according to claim 10, wherein
said first threshold matrix set is used for a first natural image and said second threshold matrix set is used for a second natural image whose spatial frequency is higher than that of said first natural image.

18. The printing method according to claim 10, wherein
printing is performed by one-time passage of said inkjet head to each position on said printing medium in said step c).

* * * * *